US012339395B2

(12) United States Patent
Yamanouchi et al.

(10) Patent No.: US 12,339,395 B2
(45) Date of Patent: Jun. 24, 2025

(54) OBJECT DETECTION APPARATUS, OBJECT DETECTION METHOD, AND NON-TRANSITORY COMPUTER READABLE MEDIUM

(71) Applicant: NEC Corporation, Tokyo (JP)

(72) Inventors: Shingo Yamanouchi, Tokyo (JP); Toshiyuki Nomura, Tokyo (JP); Masayuki Ariyoshi, Tokyo (JP); Kazumine Ogura, Tokyo (JP); Tatsuya Sumiya, Tokyo (JP)

(73) Assignee: NEC CORPORATION, Tokyo (JP)

( * ) Notice: Subject to any disclaimer, the term of this patent is extended or adjusted under 35 U.S.C. 154(b) by 581 days.

(21) Appl. No.: 17/692,390

(22) Filed: Mar. 11, 2022

(65) Prior Publication Data
US 2022/0299602 A1 Sep. 22, 2022

(30) Foreign Application Priority Data
Mar. 22, 2021 (JP) ................. 2021-047049

(51) Int. Cl.
*G01S 7/41* (2006.01)
*G01S 13/88* (2006.01)
(52) U.S. Cl.
CPC .......... *G01S 7/412* (2013.01); *G01S 13/887* (2013.01)
(58) Field of Classification Search
CPC ........................ G01S 7/412; G01B 11/0625
See application file for complete search history.

(56) References Cited

U.S. PATENT DOCUMENTS 8,946,641 B2 2/2015 Smith et al.
11,587,350 B2 * 2/2023 Roldan ............... G06V 40/103
(Continued)

FOREIGN PATENT DOCUMENTS

JP 2008-512175 A 4/2008
JP 2010-230466 A 10/2010
(Continued)

OTHER PUBLICATIONS

K. Haddadi et al., 'Geometrical Optics-Based Model for Dielectric Constant and Loss Tangent Free-Space Measurement,' IEEE Trans. Instrum. Meas., vol. 63, No. 7, pp. 1818-1823, Jul. 2014.
(Continued)

*Primary Examiner* — Vladimir Magloire
*Assistant Examiner* — Eric K Hodac

(57) ABSTRACT

For increasing measurement precision while suppressing cost increase when measuring a permittivity of an object using a radio wave, an object detection apparatus includes a transmission unit projecting a radio wave toward a target object by using a transmission antenna, a reception unit receiving the radio wave reflected by the target object by a reception antenna and generating an intermediate frequency signal, and an arithmetic apparatus. The arithmetic apparatus computes a reflection amplitude of the target object from the intermediate frequency signal, computes a reflectance from the reflection amplitude, computes a complex permittivity absolute value of the target object from the computed reflectance, computes a depth position of the target object from the reflection amplitude, computes a thickness of the target object from the depth and the reflection amplitude, and computes a permittivity of the target object from the reflection amplitude, the complex permittivity absolute value, and the thickness.

17 Claims, 12 Drawing Sheets

(56) References Cited

U.S. PATENT DOCUMENTS

| | | | |
|---|---|---|---|
| 2007/0073144 A1 | 3/2007 | Simpkin | |
| 2009/0268162 A1* | 10/2009 | Stetson | A61B 3/102 |
| | | | 351/246 |
| 2011/0304698 A1 | 12/2011 | Andrey et al. | |
| 2014/0019050 A1 | 1/2014 | Lambot | |
| 2014/0167784 A1 | 6/2014 | Ahmed | |
| 2019/0128998 A1* | 5/2019 | Josefsberg | G01S 13/867 |
| 2020/0011986 A1 | 1/2020 | Yamanouchi | |
| 2022/0252571 A1* | 8/2022 | Troxler | G01S 13/32 |

FOREIGN PATENT DOCUMENTS

| | | | |
|---|---|---|---|
| JP | 5260799 B | 8/2013 | |
| JP | 2014-219238 A | 11/2014 | |
| JP | 2016-532091 A | 10/2016 | |
| JP | 2018-011923 A | 1/2018 | |
| WO | WO-2008125929 A2 * | 10/2008 | G01S 13/9023 |
| WO | 2018-147025 A | 8/2018 | |

OTHER PUBLICATIONS

JP Official Communication for JP Application No. 2021-047049, mailed on Oct. 1, 2024 with English Translation.

\* cited by examiner

OBJECT DETECTION APPARATUS, OBJECT DETECTION METHOD, AND NON-TRANSITORY COMPUTER READABLE MEDIUM

This application is based on Japanese patent application No. 2021-047049, the content of which is incorporated hereinto by reference.

BACKGROUND

Technical Field

The present invention relates to an object detection apparatus, an object detection method, and a program for projecting a radio wave onto a detection target object and recognizing or identifying existence of the detection target object by using the radio wave reflected from the target object.

Related Art

Unlike light, a radio wave (such as a microwave, a millimeter wave, or a terahertz wave) has an excellent ability to penetrate an object. United States Patent Application Publication No. 2014/0167784 (Patent Document 1) proposes an apparatus projecting a radio wave penetrating clothing and a bag onto a hidden article under clothing or in a bag from a radar apparatus, receiving the radio wave reflected by the article by the radar apparatus, and imaging and inspecting the article, based on the received radio wave.

Further, a technology for telemetering the permittivity of a substance by a radio wave has been proposed. Since a permittivity takes an inherent value for each substance, measurement of a permittivity can be used for identification of a substance. A permittivity is particularly useful for identification of an explosive, a drug, and the like.

U.S. Pat. No. 8,946,641 (Patent Document 2) and "K. Haddadi et al, 'Geometrical Optics-Based Model for Dielectric Constant and Loss Tangent Free-Space Measurement', IEEE Trans. Instrum. Meas., vol. 63, no. 7, pp. 1818-1823, July 2014" (Non-Patent Document 1) propose methods for projecting a radio wave onto a substance from a radar apparatus, receiving the radio wave reflected from the substance by the radar apparatus, generating an intermediate frequency signal, based on the received radio wave, and estimating the permittivity of the substance by using the intermediate frequency signal. Specifically, geometrical optics modeling having the permittivity of a substance being a measurement target as an unknown variable is used. When a value of a permittivity being an unknown variable is given, a geometrical optics model can compute an intermediate frequency signal. Then, the permittivity of the substance is estimated from a permittivity value of a geometrical optics model best reproducing a measured value of the intermediate frequency signal.

Japanese Patent No. 5260799 (Patent Document 3) proposes a method for measuring a permittivity by an object detection apparatus including a radar and a camera. Specifically, a radio wave is projected onto a substance and a background reflector from a radar apparatus and a three-dimensional microwave image is generated based on radio waves reflected from the substance and the background reflector. The object detection apparatus measures the distances from the object detection apparatus to the substance and the background reflector by using the three-dimensional microwave image and a camera image and further estimates a permittivity from the distances acquired by the measurement.

Further, International Application Publication No. WO 2018/147025 (Patent Document 4) describes projecting a radio wave onto a substance as a transmission signal, receiving the radio wave reflected from the substance as a reception signal, and generating an intermediate frequency signal by mixing the transmission signal and the reception signal. The intermediate frequency signal is used when a spectrum representing a position distribution of an object is computed.

Further, Japanese Patent Application Publication No. 2018-011923 (Patent Document 5) describes a condition detection apparatus for detecting a foreign substance or an abnormal part in a human body by using a standing wave radar. By combining a transmission wave with a reception wave being a received reflected wave reflected by an external measurement target, the condition detection apparatus detects a combined wave. Then, the condition detection apparatus determines a distance spectrum by removing a direct current component from a frequency intensity distribution of the combined wave and Fourier transforming the resulting distribution.

Japanese Patent Application Publication No. 2008-512175 (Patent Document 6) describes using a plurality of antenna elements and collecting reflection coefficient data of a body part of a patient across a frequency range of a microwave in a system generating a three-dimensional image of the body part.

SUMMARY

The methods for estimating the permittivity of a substance, based on geometrical optics, in Patent Document 2 and Non-Patent Document 1 are premised on use of a single transmission antenna and a single reception antenna. Use of a single transmission antenna and a single reception antenna has a problem that the method is susceptible to noise of a radar apparatus and precise estimation of the permittivity of a substance is difficult.

In Patent Document 3, a three-dimensional microwave image is generated by an antenna array configured with a plurality of transmission antennas and a plurality of reception antennas. Unlike the methods of using a single transmission antenna and a single reception antenna in Patent Document 2 and Non-Patent Document 1, use of an antenna array is less susceptible to noise of a radar apparatus.

On the other hand, a camera apparatus is required in addition to a radar apparatus in Patent Document 3. Therefore, there is a problem of cost increase due to use of a camera. Furthermore, a synchronization operation between the radar and the camera is also required. There is a problem that synchronization deviation between the radar and the camera causes a measurement error of a permittivity when a measurement target object moves.

An object of the present invention is to increase measurement precision while suppressing cost increase when the permittivity of an object is measured by using a radio wave.

In one embodiment, there is provided an object detection apparatus for detecting an object by a radio wave, the object detection apparatus including: a transmission unit including a plurality of transmission antennas projecting a radio wave toward the object; a reception unit including a plurality of reception antennas receiving the radio wave reflected from the object and further generating an intermediate frequency signal from a reception signal received by the reception antennas; a three-dimensional reflection amplitude computation unit that computes a distribution of a reflection amplitude of the object in a three-dimensional space from the intermediate frequency signal; a two-dimensional reflection amplitude computation unit that computes a reflection amplitude in a two-dimensional plane from a maximum value possibly taken by the three-dimensional reflection amplitude in a depth direction perpendicular to the two-dimensional plane; and a complex permittivity absolute value computation unit that computes a reflectance of the object by normalizing the two-dimensional reflection amplitude by a maximum value of the two-dimensional reflection amplitude and computing a complex permittivity absolute value of the object from the reflectance.

In another example embodiment, there is provided an object detection method for detecting an object by a radio wave, the object detection method including: a step of projecting a radio wave toward the object from a transmission unit including a plurality of transmission antennas; a step of, by a reception unit including a plurality of reception antennas, receiving the radio wave reflected from the object and further generating an intermediate frequency signal from a reception signal received by the reception antennas; a step of, by a three-dimensional reflection amplitude computation unit, computing a reflection amplitude of the object in a three-dimensional space from the intermediate frequency signal; a step of, by a two-dimensional reflection amplitude computation unit, computing a reflection amplitude in a two-dimensional plane from a maximum value possibly taken by the three-dimensional reflection amplitude in a depth direction perpendicular to the two-dimensional plane; and a step of, by a complex permittivity absolute value computation unit, computing a reflectance of the object by normalizing the two-dimensional reflection amplitude by a maximum value of the two-dimensional reflection amplitude and computing a complex permittivity absolute value of the object from the reflectance.

In still another example embodiment, there is provided a program causing an object detection apparatus including: a transmission unit including a plurality of transmission antennas projecting a radio wave toward an object; a reception unit including a plurality of reception antennas receiving the radio wave reflected from the object and further generating an intermediate frequency signal from a reception signal received by the reception antennas; and a processor to execute: a step of, by a three-dimensional reflection amplitude computation unit, computing a reflection amplitude of the object in a three-dimensional space from the intermediate frequency signal; a step of, by a two-dimensional reflection amplitude computation unit, computing a reflection amplitude in a two-dimensional plane from a maximum value possibly taken by the three-dimensional reflection amplitude in a depth direction perpendicular to the two-dimensional plane; and a step of, by a complex permittivity absolute value computation unit, computing a reflectance of the object by normalizing the two-dimensional reflection amplitude by a maximum value of the two-dimensional reflection amplitude and computing a complex permittivity absolute value of the object from the reflectance.

The present invention can increase measurement precision while suppressing cost increase when the permittivity of an object is measured by using a radio wave.

BRIEF DESCRIPTION OF THE DRAWINGS

The above and other objects, advantages and features of the present invention will be more apparent from the following description of certain preferred example embodiments taken in conjunction with the accompanying drawings, in which.

DETAILED DESCRIPTION

The invention will be now described herein with reference to illustrative example embodiments. Those skilled in the art will recognize that many alternative example embodiments can be accomplished using the teachings of the present invention and that the invention is not limited to the example embodiments illustrated for explanatory purposes.

Preferred example embodiments of an object detection apparatus and an object detection method according to the present invention are described below with reference to attached drawings. Note that the same or equivalent parts in the following drawings are given the same sign, and duplicated description thereof is omitted.

An object detection apparatus, an object detection method, and a program according to example embodiments of the present invention are described below referring to FIG. 1 to FIG. 12. The example embodiments disclose an object detection apparatus, an object detection method, and a program achieving permittivity measurement being less susceptive to noise of a radar apparatus and eliminating a cost and an error that result from another sensor other than a radar.

First Example Embodiment

Apparatus Configuration

Figure 1:
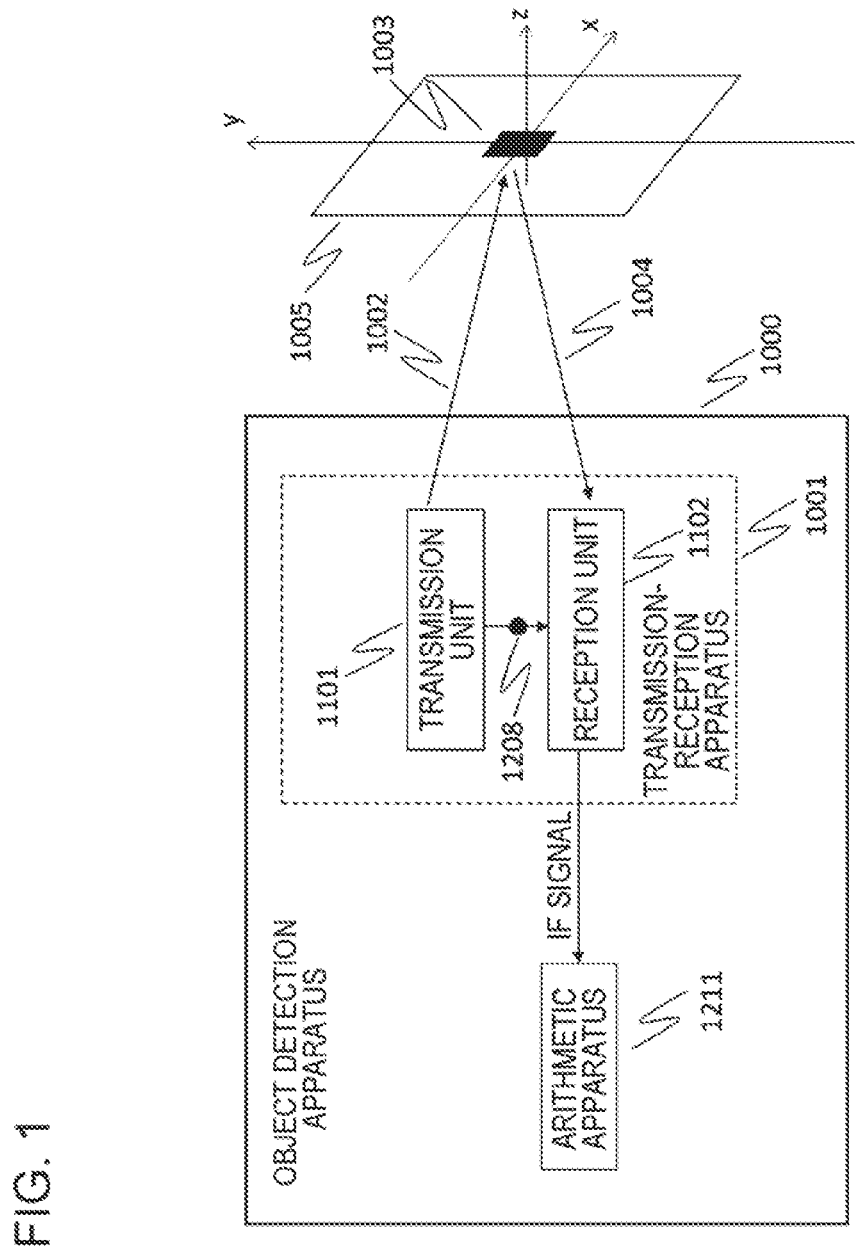
FIG. 1 is a configuration diagram illustrating a configuration of an object detection apparatus according to a first example embodiment.

First, a configuration of an object detection apparatus according to a first example embodiment is described by using FIG. 1. An object detection apparatus 1000 according to the present example embodiment illustrated in FIG. 1 is an apparatus for detecting an object by a radio wave. As illustrated in FIG. 1, the object detection apparatus 1000 includes a transmission unit 1101, a reception unit 1102, and an arithmetic apparatus 1211.

Figure 2:
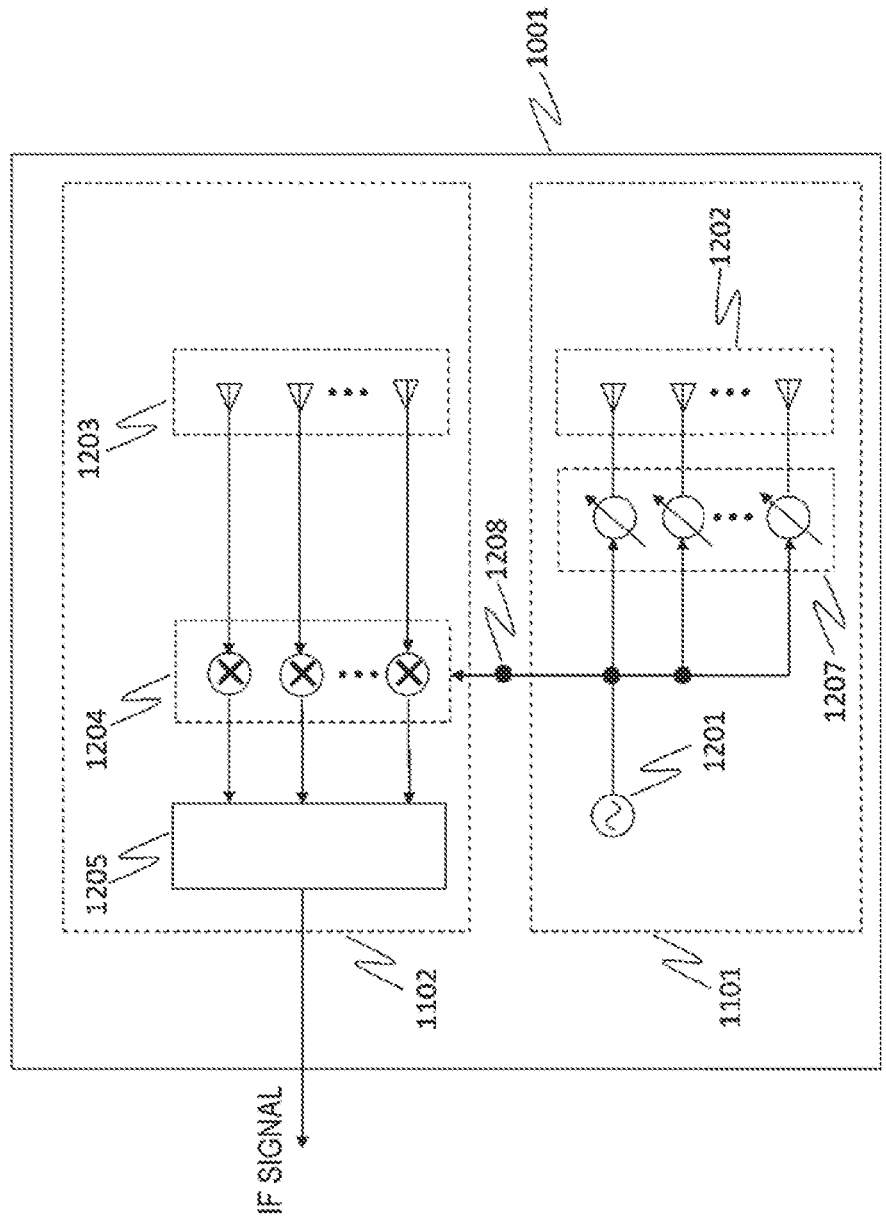
FIG. 2 is a block diagram illustrating an example of a configuration of the object detection apparatus according to the first example embodiment.

Next, FIG. 2 illustrates internal configurations of the transmission unit 1101 and the reception unit 1102 according to the present example embodiment. In the example illustrated in FIG. 2, the transmission unit 1101 includes an oscillator 1201, a variable amplitude phase shifter 1207, and a transmission antenna 1202. The reception unit 1102 includes a reception antenna 1203, a mixer 1204, and an interface circuit 1205. Furthermore, as also illustrated in FIG. 1, the transmission unit 1101 and the reception unit 1102 are connected through a terminal 1208. Each of the transmission antenna 1202 and the reception antenna 1203 is an antenna array configured with a plurality of antennas.

Figure 3:
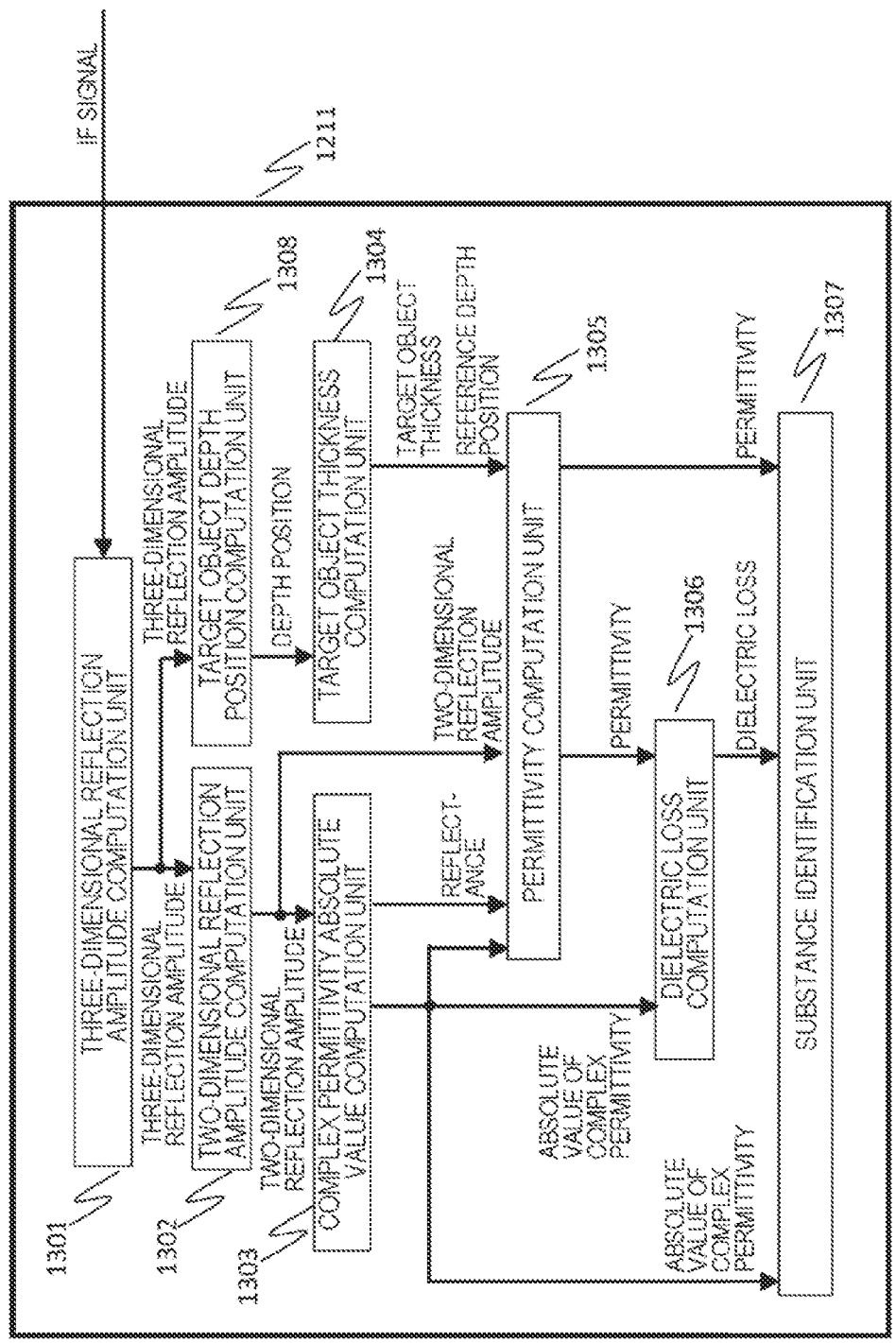
FIG. 3 is a block diagram illustrating an example of a configuration of the object detection apparatus according to the first example embodiment.

Next, FIG. 3 illustrates an internal configuration of the arithmetic apparatus 1211 according to the present example embodiment. As illustrated in FIG. 3, the arithmetic apparatus 1211 according to the present example embodiment includes a three-dimensional reflection amplitude computation unit 1301, a two-dimensional reflection amplitude computation unit 1302, a complex permittivity absolute value computation unit 1303, a target object thickness computation unit 1304, a permittivity computation unit 1305, a dielectric loss computation unit 1306, a substance identification unit 1307, and a target object depth position computation unit 1308. Details of each functional unit are described later.

Operation of Apparatus

Next, operation of the object detection apparatus according to the first example embodiment illustrated in FIG. 1 to FIG. 3 is described.

In the apparatus configuration illustrated in FIG. 1, the transmission unit 1101 projects a radio wave 1002 being a transmission signal toward a detection target (hereinafter denoted as a "target object") 1003 existing on a target object placement plane 1005. The projection of the radio wave 1002 is performed by the transmission antenna 1202.

The reception unit 1102 in FIG. 1 receives a radio wave 1004 reflected by the target object 1003 as a reception signal. The reception is performed by the reception antenna 1203. The reception unit 1102 further generates an intermediate frequency signal (hereinafter described as an "IF signal") by mixing the received reception signal with a transmission signal generated by the transmission unit 1101. Specifically, as illustrated in FIG. 1, the transmission unit 1101 outputs a transmission signal to the reception unit 1102 through the terminal 1208. The reception unit 1102 generates an IF signal by mixing a reception result (that is, a reception signal) of a radio wave reflected from the target object 1003 with the transmission signal acquired through the terminal 1208. The transmission unit 1101 outputs the generated IF signal to the arithmetic apparatus 1211.

In the transmission unit 1101 illustrated in the internal configuration in FIG. 2, the oscillator 1201 generates a radio frequency (RF) signal (radio wave). The RF signal generated by the oscillator 1201 is output after the amplitude and the phase of the signal are changed to desired values by the variable amplitude phase shifter 1207. The RF signal (radio wave) output from the variable amplitude phase shifter 1207 is projected onto the target object 1003 from the transmission antenna 1202 as the radio wave 1002. While the frequency band of the radio wave 1002 may be any band, it is desirable to select and set a frequency band from bands such as a microwave band (3 GHz to 30 GHz) and a millimeter wave band (30 GHz to 300 GHz).

In the reception unit 1102 illustrated in the internal configuration in FIG. 2, the radio wave 1004 reflected by the target object 1003 is received by the reception antenna 1203. The mixer 1204 generates an IF signal by mixing an RF signal input from the oscillator 1201 through the terminal 1208 with the radio wave (reception signal) received by the reception antenna 1203. The IF signal generated by the mixer 1204 is transmitted to the arithmetic apparatus 1211 through the interface circuit 1205. The interface circuit 1205 has a function of converting the IF signal being an analog signal into a digital signal that can be handled by the arithmetic apparatus 1211 and outputs the acquired digital signal to the arithmetic apparatus 1211.

In the arithmetic apparatus 1211 illustrated in the internal configuration in FIG. 3, the IF signal output from the reception unit 1102 is input to the three-dimensional reflection amplitude computation unit 1301. Based on the IF signal output from the reception unit 1102, the three-dimensional reflection amplitude computation unit 1301 computes a reflection amplitude p(x, y, z) defined as the amplitude of a reflected wave reflected from the target object 1003 at a three-dimensional position (x, y, z) as a three-dimensional reflection amplitude. Examples of a computation method of the three-dimensional reflection amplitude include a beamformer method. With regard to the three-dimensional position (x, y, z), an x-axis and a y-axis are assumed to be parallel to the target object placement plane 1005 in FIG. 1, and a z-axis is assumed to be perpendicular to the target object placement plane 1005.

The three-dimensional reflection amplitude p(x, y, z) computed by the three-dimensional reflection amplitude computation unit 1301 is input to the target object depth position computation unit 1308. The target object depth position computation unit 1308 computes a depth position $z_d(x, y)$ indicating a position of the target object 1003 in the z-axis direction at a two-dimensional position (x, y). Specifically, the depth position $z_d(x, y)$ is computed as a position in the z-axis direction maximizing the three-dimensional reflection amplitude p(x, y, z) at each point of the two-dimensional position (x, y) as indicated in equation (1).

$$z_d(x,y)=\mathrm{argmax}_z[p(x,y,z)], \quad (1)$$

The three-dimensional reflection amplitude p(x, y, z) computed by the three-dimensional reflection amplitude computation unit 1301 is input to the two-dimensional reflection amplitude computation unit 1302. Based on the input three-dimensional reflection amplitude p(x, y, z), the two-dimensional reflection amplitude computation unit 1302 computes a two-dimensional reflection amplitude $p_d(x, y)$ of the target object 1003 with a two-dimensional position (x, y) as an argument. Specifically, the two-dimensional reflection amplitude $p_d(x, y)$ is computed as a maximum value of the three-dimensional reflection amplitude p(x, y, z) when z is changed at each point of the two-dimensional position (x, y) as expressed in equation (2).

$$p_d(x,y)=\mathrm{max}_z[p(x,y,z)]=p(x,y,z_d(x,y)), \quad (2)$$

The two-dimensional reflection amplitude $p_d(x, y)$ computed by the two-dimensional reflection amplitude computation unit 1302 is input to the complex permittivity absolute value computation unit 1303. Based on the input two-dimensional reflection amplitude $p_d(x, y)$, the complex permittivity absolute value computation unit 1303 computes the absolute value $|\varepsilon_c(x, y)|$ of the complex permittivity of the target object 1003 at a two-dimensional position (x, y).

Specifically, the complex permittivity absolute value computation unit 1303 first computes the reflectance R(x, y)

of the target object 1003 from a value acquired by normalizing the two-dimensional reflection amplitude $p_d(x, y)$ by the maximum value thereof in accordance with the following equation (3).

$$R(x,y)=p_d(x,y)/\max_{(x,y)}[p_d(x,y)], \tag{3}$$

Next, the complex permittivity absolute value computation unit 1303 computes the absolute value $|\varepsilon_c(x, y)|$ of the complex permittivity of the target object 1003 from the reflectance $R(x, y)$ of the target object 1003 in accordance with the following equation (4).

$$|\varepsilon_c(x,y)|=[1+R(x,y)]^2/[1-R(x,y)]^2, \tag{4}$$

The depth position $z_d(x, y)$ computed by the target object depth position computation unit 1308 is input to the target object thickness computation unit 1304. Based on the input depth position $z_d(x, y)$, the target object thickness computation unit 1304 computes a target object thickness $d(x, y)$ and a reference depth position $z_{ref}(x, y)$ at a two-dimensional position (x, y).

Figure 4:
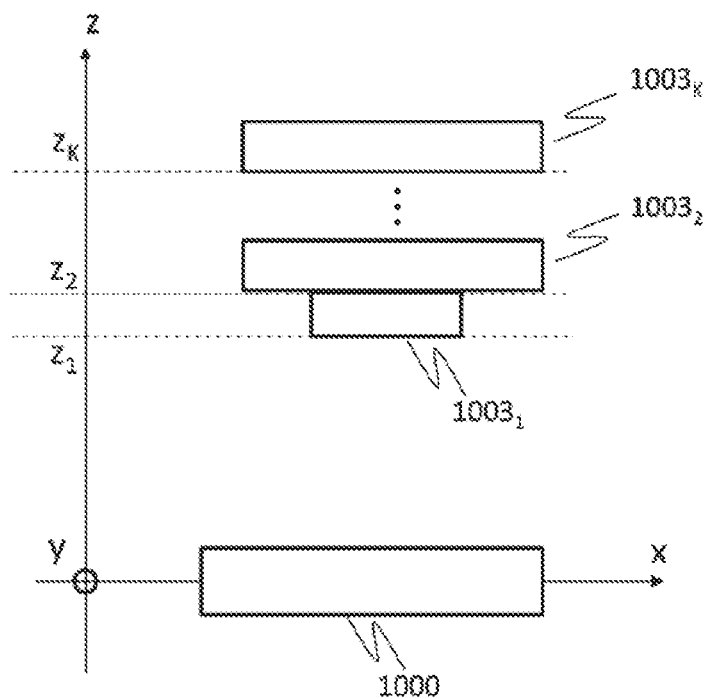
FIG. 4 is a diagram illustrating an example of a positional relation between the object detection apparatus and a target object.

First, a specific computation method of a reference depth position $z_{ref}(x, y)$ is described below. A case of the positional relation between the object detection apparatus 1000 and target objects 1003 being a placement illustrated in FIG. 4 is described as an example. FIG. 4 is a top view and is a diagram illustrating the object detection apparatus 1000 and the target objects 1003 viewed from above along the y-axis direction. In the placement illustrated in FIG. 4, positions of surfaces of the target objects $1003_1, 1003_2, \ldots, 1003_K$ in the z-axis direction are denoted by $z_1, z_2, \ldots, z_K$, respectively (where K is the number of the target objects 1003).

Figure 5:
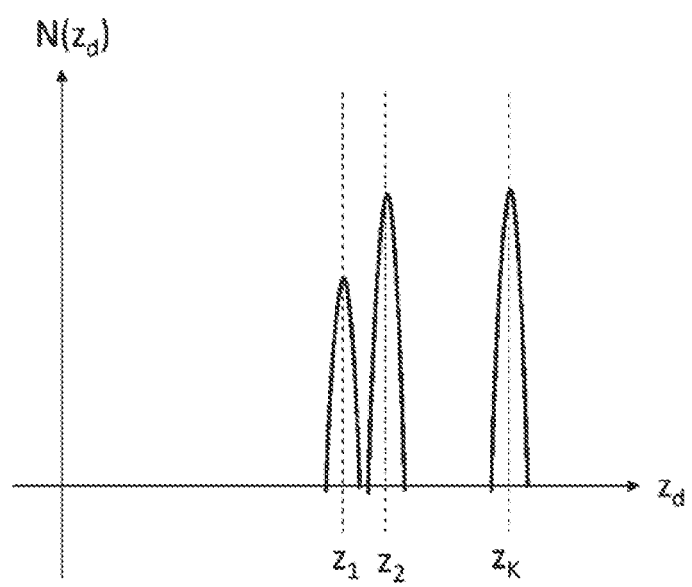
FIG. 5 is a diagram illustrating a histogram of depth positions.

The same number of numerical values of depths $z_d$ as the number of points in the domain (x, y) are acquired from the depth positions $z_d(x, y)$ input to the target object thickness computation unit 1304. The target object thickness computation unit 1304 computes a distribution state of numerical values of the depths $z_d$ by using a histogram $N(z_d)$ of the depths $z_d$. An example of the histogram $N(z_d)$ related to the placement in FIG. 4 is illustrated in FIG. 5. As illustrated in FIG. 5, the histogram $N(z_d)$ takes peaks at positions $z_1, z_2, \ldots, z_K$ at the surface of the target objects $1003_1, 1003_2, \ldots, 1003_K$ in the z-axis direction. Then, when a depth position $z_d(x, y)$ at a two-dimensional position (x, y) satisfies $z_{i-1} \leq z_d(x, y) < z_i$, the target object thickness computation unit 1304 sets a reference depth position $z_{ref}(x, y)$ in accordance with the following equation (5).

$$z_{ref}(x,y)=z_i \tag{5}$$

Then, the target object thickness computation unit 1304 computes a target object thickness $d(x, y)$ in accordance with the following equation (6) by using the depth position $z_d(x, y)$ and the reference depth position $z_{ref}(x, y)$.

$$d(x,y)=z_{ref}(x,y)-z_d(x,y) \tag{6}$$

In the example described above, the target object thickness computation unit 1304 detects the positions $z_1, z_2, \ldots, z_K$ at the surface of the target objects $1003_1, 1003_2, \ldots, 1003_K$ in the z-axis direction from peak values in the histogram counting the number $N(z_d)$ of depth positions $z_d$ included in the x-y plane. As another means, the target object thickness computation unit 1304 may detect the positions $z_1, z_2, \ldots, z_K$ at the surface of the target objects $1003_1, 1003_2, \ldots, 1003_k$ in the z-axis direction from positions in the z-axis direction where peaks of a function $g(z)=\Sigma_{(x, y)}[p(x, y, z)]$ acquired as the sum of three-dimensional reflection amplitudes $p(x, y, z)$ in the x-y plane in the x-y plane are acquired.

The two-dimensional reflection amplitude $p_d(x, y)$ computed by the two-dimensional reflection amplitude computation unit 1302, the absolute value $|\varepsilon_c(x, y)|$ of the complex permittivity and the reflectance $R(x, y)$ that are computed by the complex permittivity absolute value computation unit 1303, and the target object thickness $d(x, y)$ and the reference depth $z_{ref}(x, y)$ that are computed by the target object thickness computation unit 1304 are input to the permittivity computation unit 1305. Based on the input data, the permittivity computation unit 1305 computes the permittivity $\varepsilon_r(x, y)$ of the target object 1003 at a two-dimensional position (x, y). The permittivity $\varepsilon_r(x, y)$ corresponds to the real part of the complex permittivity $\varepsilon_c(x, y)$.

A specific computation method of a permittivity $\varepsilon_r(x, y)$ is described below. The permittivity computation unit 1305 computes a radio wave absorption amount $\Delta a(x, y)$ at a two-dimensional position (x, y) in accordance with the following equation (7) by using the input two-dimensional reflection amplitude $p_d(x, y)$, the input reference depth $z_{ref}(x, y)$, and the input reflectance $R(x, y)$.

$$\Delta a(x,y)=p_d(x,y)/p[x,y,z_{ref}(x,y)]/[1-R(x,y)]^2, \tag{7}$$

Next, the permittivity computation unit 1305 computes an absorption coefficient $\alpha(x, y)$ at a two-dimensional position (x, y) in accordance with the following equation (8) by using the computed radio wave absorption amount $\Delta a(x, y)$ and the input target object thickness $d(x, y)$.

$$\alpha(x,y)=-\ln(\Delta a(x,y))/2d(x,y), \tag{8}$$

Next, the permittivity computation unit 1305 computes a permittivity $\varepsilon_r(x, y)$ at a two-dimensional position (x, y) in accordance with the following equation (9) by using the computed absorption coefficient $\alpha(x, y)$ and the input absolute value $|\varepsilon_c(x, y)|$ of the complex permittivity.

$$\varepsilon_r(x,y)=|\varepsilon_c(x,y)|-2(\lambda\alpha(x,y)/2\pi)^2 \tag{9}$$

Note that $\lambda$ in equation (9) denotes the wavelength of a radio wave transmitted by the transmission unit 1101.

The absolute value $|\varepsilon_c(x, y)|$ of the complex permittivity computed by the complex permittivity absolute value computation unit 1303 and the permittivity $\varepsilon_r(x, y)$ computed by the permittivity computation unit 1305 are input to the dielectric loss computation unit 1306. Based on the input data, the dielectric loss computation unit 1306 computes the dielectric loss $\varepsilon_i(x, y)$ of the target object 1003 at a two-dimensional position (x, y). The dielectric loss $\varepsilon_i(x, y)$ corresponds to the imaginary part of the complex permittivity $\varepsilon_c(x, y)$.

A specific computation method of a permittivity $\varepsilon_i(x, y)$ is described below. The dielectric loss computation unit 1306 computes a dielectric loss $\varepsilon_i(x, y)$ at a two-dimensional position (x, y) in accordance with the following equation (10) by using the input absolute value $|\varepsilon_c(x, y)|$ of the complex permittivity and the input permittivity $\varepsilon_r(x, y)$.

$$\varepsilon_i(x,y)=\text{sqrt}(|\varepsilon_c(x,y)|^2-\varepsilon_r(x,y)^2). \tag{10}$$

Each of the absolute value $|\varepsilon_c(x, y)|$ of the complex permittivity computed by the complex permittivity absolute value computation unit 1303, the permittivity $\varepsilon_r(x, y)$ computed by the permittivity computation unit 1305, and the dielectric loss $\varepsilon_i(x, y)$ computed by the dielectric loss computation unit 1306 may be output as a two-dimensional image.

At least one of the absolute value $|\varepsilon_c(x, y)|$ of the complex permittivity computed by the complex permittivity absolute value computation unit 1303, the permittivity $\varepsilon_r(x, y)$ computed by the permittivity computation unit 1305, and the dielectric loss $\varepsilon_i(x, y)$ computed by the dielectric loss computation unit 1306 is input to the substance identification unit 1307. The substance identification unit 1307 includes a database storing a value of the complex permittivity absolute value, the permittivity, or the dielectric loss of each of various substances. The substance identification unit 1307 identifies a constituent substance of the target object 1003 by checking at least one of the absolute value $|\varepsilon_c(x, y)|$ of the complex permittivity, the permittivity $\varepsilon_r(x, y)$, or the dielectric loss $\varepsilon_i(x, y)$ input to the substance identification unit 1307 against a value in the database.

Second Example Embodiment

Figure 6:
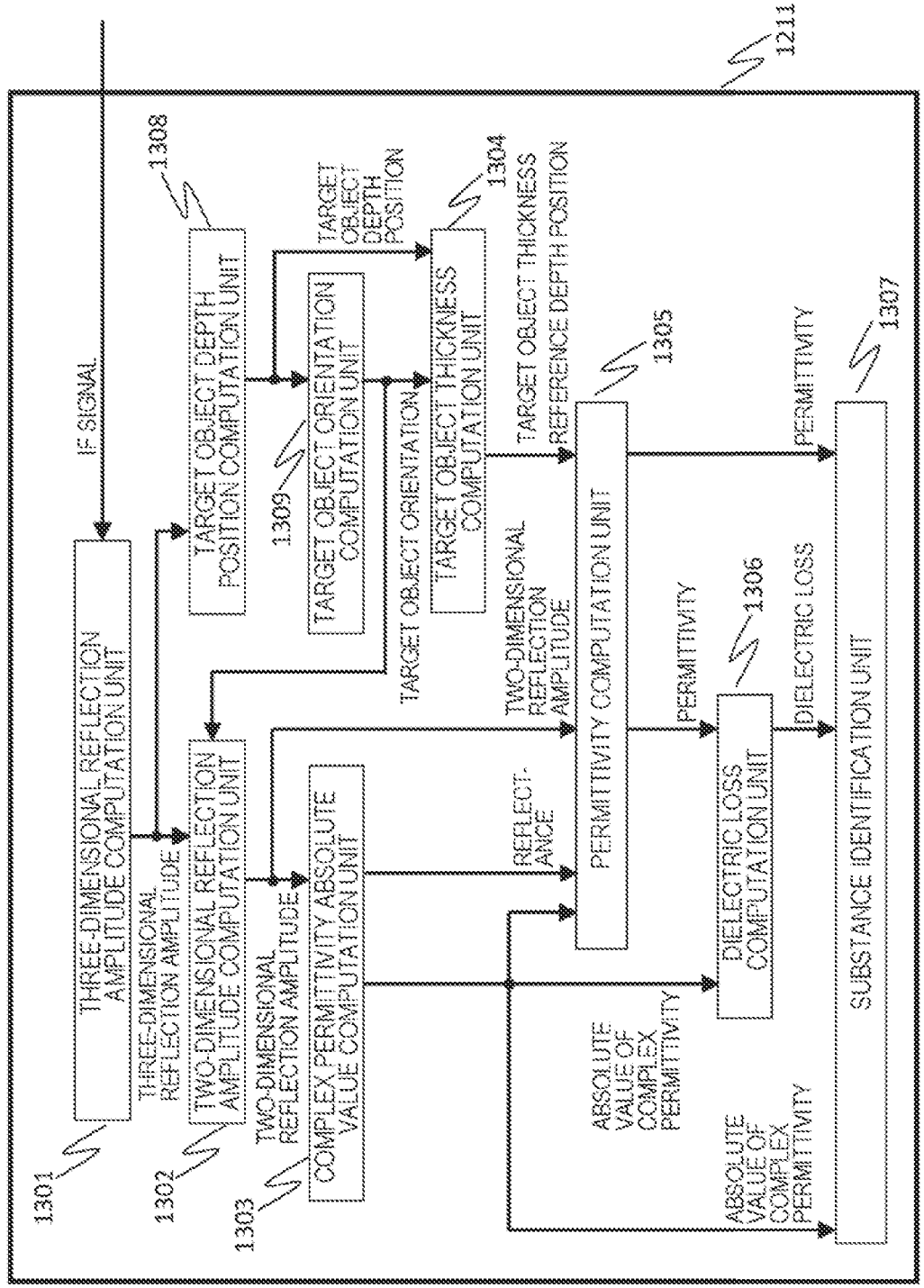
FIG. 6 is a block diagram illustrating an example of a configuration of an object detection apparatus.
Figure 7:
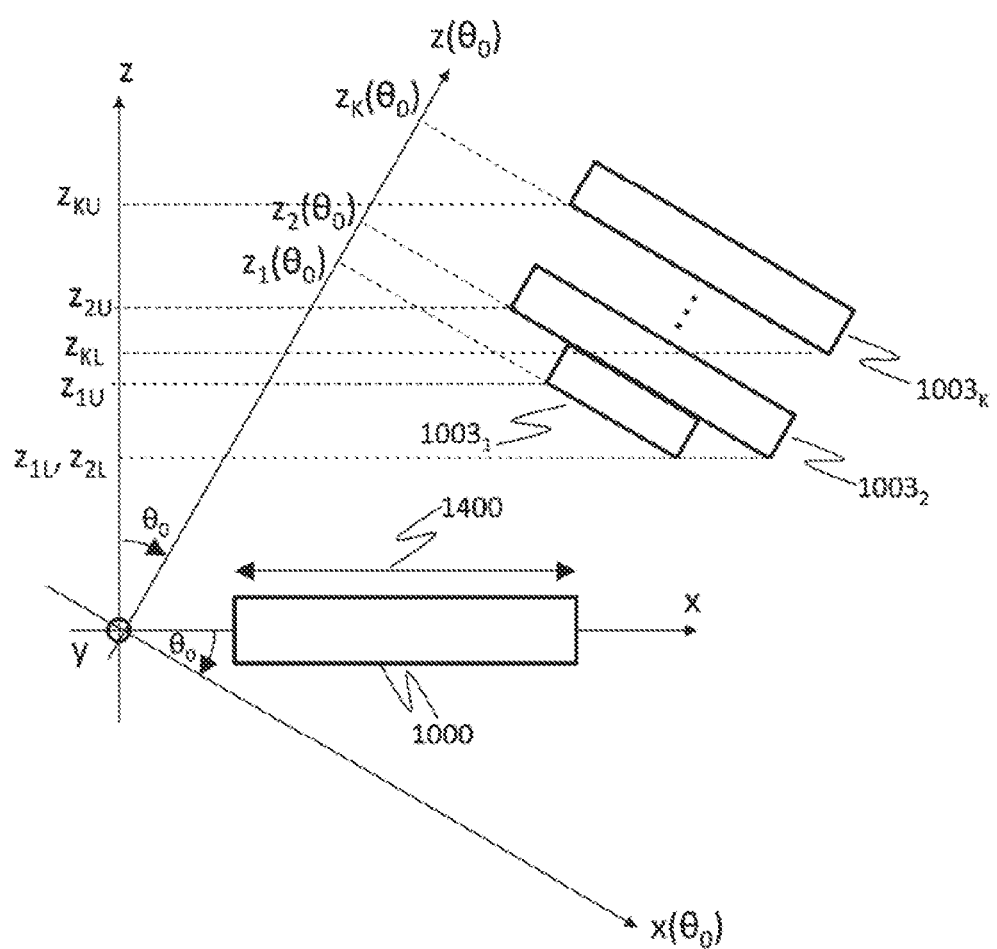
FIG. 7 is a diagram illustrating an example of a positional relation between the object detection apparatus and a target object.

Next, a second example embodiment is described. The second example embodiment provides an object detection method in a case of a surface of a target object 1003 not being parallel to an aperture plane 1400 formed by a transmission antenna 1202 and a reception antenna 1203 in an object detection apparatus 1000, as illustrated in FIG. 7.
Apparatus Configuration An apparatus configuration according to the second example embodiment is illustrated in FIG. 1, FIG. 2, and FIG. 6. FIG. 1 and FIG. 2 are in common with the first example embodiment, and therefore duplicated description thereof is omitted.

FIG. 6 illustrates an internal configuration of an arithmetic apparatus 1211 according to the second example embodiment. The internal configuration of the arithmetic apparatus 1211 according to the second example embodiment illustrated in FIG. 6 is acquired by adding a target object orientation computation unit 1309 to the internal configuration of the arithmetic apparatus 1211 according to the first example embodiment illustrated in FIG. 3. Components other than the target object orientation computation unit 1309 are common to the first example embodiment illustrated in FIG. 3 and the second example embodiment illustrated in FIG. 6.
Operation of Apparatus In a placement illustrated in FIG. 7, the surface of a target object 1003 is assumed to be tilted at an angle $\theta_0$ relative to the aperture plane 1400 of the object detection apparatus 1000. Further, axes acquired by tilting a z-axis and an x-axis at the angle $\theta_0$ are denoted by a $z(\theta_0)$ axis and an $x(\theta_0)$ axis, respectively. Since the angle $\theta_0$ is an unknown variable, the value of the angle $\theta_0$ needs to be computed based on a measurement result. The value of the angle $\theta_0$ is computed by the target object orientation computation unit 1309, according to the second example embodiment.

A computation method of the value of the angle $\theta_0$ is described below. A target object depth position computation unit 1308 sets a $z(\theta)$ axis and an $x(\theta)$ axis being axes acquired by tilting the z-axis and the x-axis at an angle $\theta$. The target object depth position computation unit 1308 computes a depth position $z_d[x(\theta), y, \theta]$ as a position in the $z(\theta)$ axis direction maximizing a three-dimensional reflection amplitude $p(x, y, z)$ input from a three-dimensional reflection amplitude computation unit 1301.

$$z_d[x(\theta), y, \theta] = \mathrm{argmax}_{z(\theta)}[p(x,y,z)], \qquad (11)$$

The computed depth position $z_d[x(\theta), y, \theta]$ is input to the target object orientation computation unit 1309.

Next, based on the input depth position $z_d[x(\theta), y, \theta]$, the target object orientation computation unit 1309 computes a histogram counting the number $N[z_d(\theta)]$ of depth positions $z_d[x(\theta), y, \theta]$ included in an $x(\theta)$-y plane.

Figure 8:
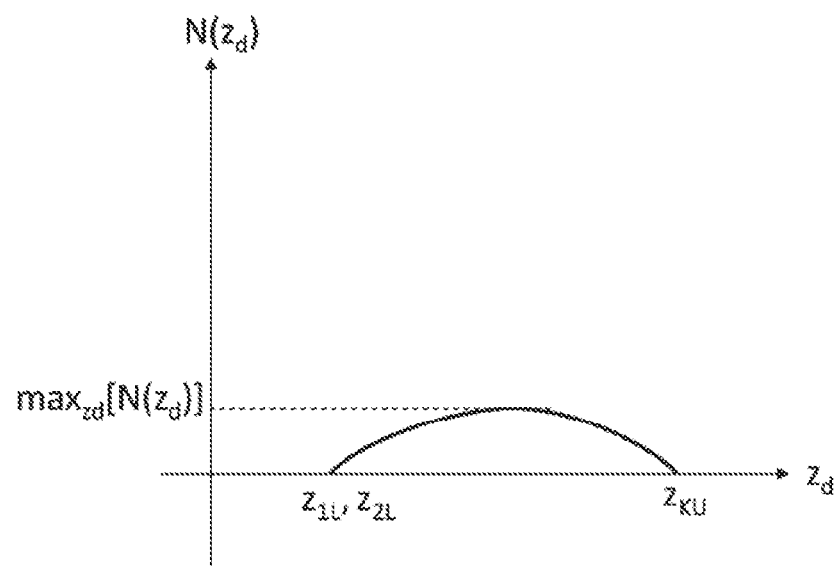
FIG. 8 is a diagram illustrating a histogram of depth positions.
Figure 9:
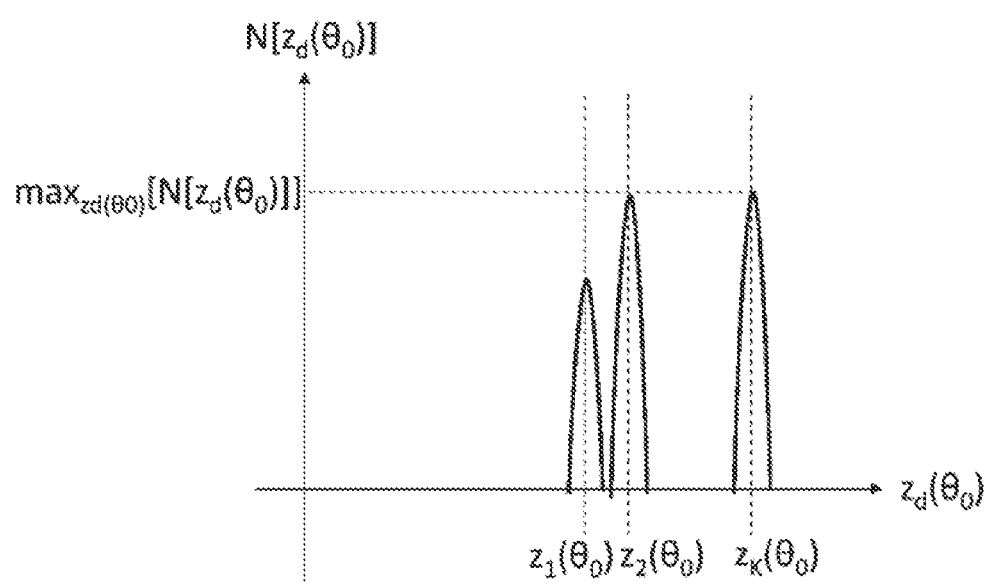
FIG. 9 is a diagram illustrating a histogram of depth positions.

FIG. 8 and FIG. 9 illustrate examples of the histogram $N[z_d(\theta)]$ of depth positions $z_d[x(\theta), y, \theta]$ related to the placement in FIG. 7. FIG. 8 illustrates a histogram of depth positions along the z-axis direction when the angle $\theta$ is 0 degrees, and FIG. 9 illustrates a histogram of depth positions along the $z(\theta_0)$ axis direction when the angle $\theta$ matches the tilt angle $\theta_0$ of the target object 1003. When the set angle $\theta$ does not match the tilt angle $\theta_0$ of the target object 1003 as is the case illustrated in FIG. 8, the maximum value $\max_{zd}[N(z_d)]$ of the histogram lowers. On the other hand, when the set angle $\theta$ matches the tilt angle $\theta_0$ of the target object 1003 as is the case illustrated in FIG. 9, the maximum value $\max_{zd(00)}[N[z_d(\theta_0)]]$ of the histogram rises. Accordingly, it is desirable that the target object orientation computation unit 1309 compute dependency of the histogram maximum value on the set angle $\theta$ and use the value of the angle $\theta$ maximizing the histogram maximum value as a computed value of the actual tilt angle $\theta_0$ of the target object 1003.

Similarly to the first example embodiment, a function $g(z(\theta)) = \Sigma_{(x(\theta), y)}[p(x(\theta), y, z(\theta))]$ acquired as the sum of three-dimensional reflection amplitudes $p(x(\theta), y, z(\theta))$ in the $x(\theta)$-y plane may be used in place of the histogram $N[z_d(\theta)]$ of depth positions $z_d[x(\theta), y, \theta]$ in the second example embodiment also.

A target object thickness computation unit 1304 computes a histogram $N[z_d(\theta_0)]$ of depth positions $z_d[x(\theta_0), y, \theta_0]$ for the tilt angle $\theta_0$ from the computed value of the tilt angle $\theta_0$ of the target object 1003 computed by the target object orientation computation unit 1309 and the depth position computed by the target object depth position computation unit 1308. Furthermore, the target object thickness computation unit 1304 computes a reference depth position $z_{ref}(x(\theta_0), y)$ and a target object thickness $d(x(\theta_0), y)$ from the peak value of the histogram $N[z_d(\theta_0)]$ by a procedure similar to that according to the first example embodiment.

Furthermore, based on the three-dimensional reflection amplitude $p(x, y, z)$ input from the three-dimensional reflection amplitude computation unit 1301 and the computed value of the tilt angle $\theta_0$ of the target object 1003 computed by the target object orientation computation unit 1309, a two-dimensional reflection amplitude computation unit 1302 computes a two-dimensional reflection amplitude $p_d[x(\theta_0), y]$ as expressed in equation (12) as a maximum value of a three-dimensional reflection amplitude when $z(\theta_0)$ is changed at each point of a two-dimensional position $(x(\theta_0), y)$.

$$p_d(x(\theta_0), y) = \max_{z(\theta 0)}[p[x(\theta_0), y, z(\theta_0)]] \qquad (12)$$

Subsequently, a complex permittivity absolute value computation unit 1303, the target object thickness computation unit 1304, a permittivity computation unit 1305, and a dielectric loss computation unit 1306 compute a complex permittivity absolute value, a permittivity, and a dielectric loss by performing processing identical to that in the first example embodiment with the depth position $z_d[x(\theta_0), y, \theta_0]$ based on the tilt angle $\theta_0$, the two-dimensional reflection amplitude $p_d[x(\theta_0), y]$, the target object thickness $d(x(\theta_0), y)$, and the reference depth position $z_{ref}(x(\theta_0), y)$ in place of a depth position $z_d(x, y)$, a two-dimensional reflection amplitude $p_d(x, y)$, a target object thickness $d(x, y)$, and a reference depth position $z_{ref}(x, y)$ as input data.

A substance identification unit 1307 according to the second example embodiment also identifies a constituent substance of the target object 1003 by checking at least one of the complex permittivity absolute value, the permittivity, and the dielectric loss input to the substance identification unit 1307 against a value in the aforementioned database.

Figure 10:
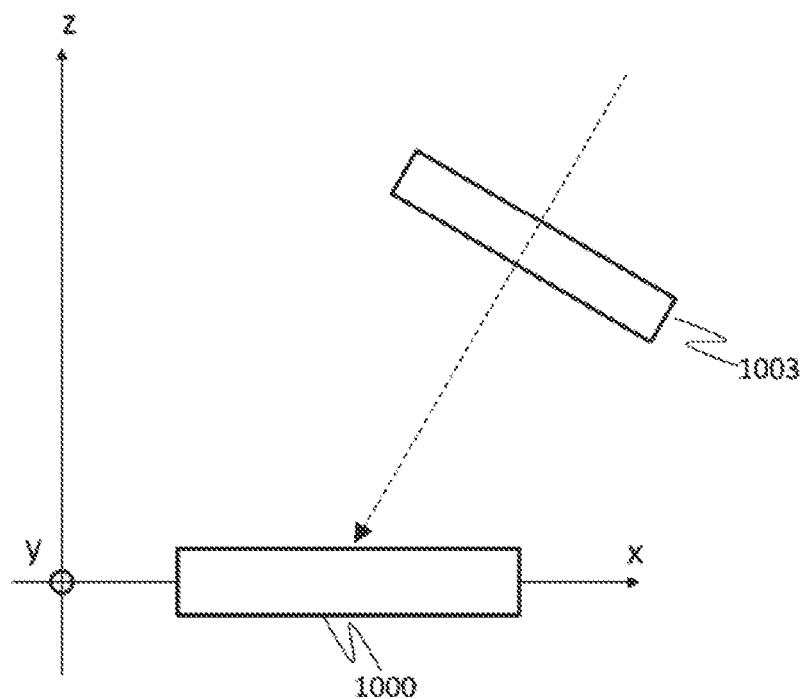
FIG. 10 is a diagram illustrating an example of a positional relation between the object detection apparatus and a target object.
Figure 11:
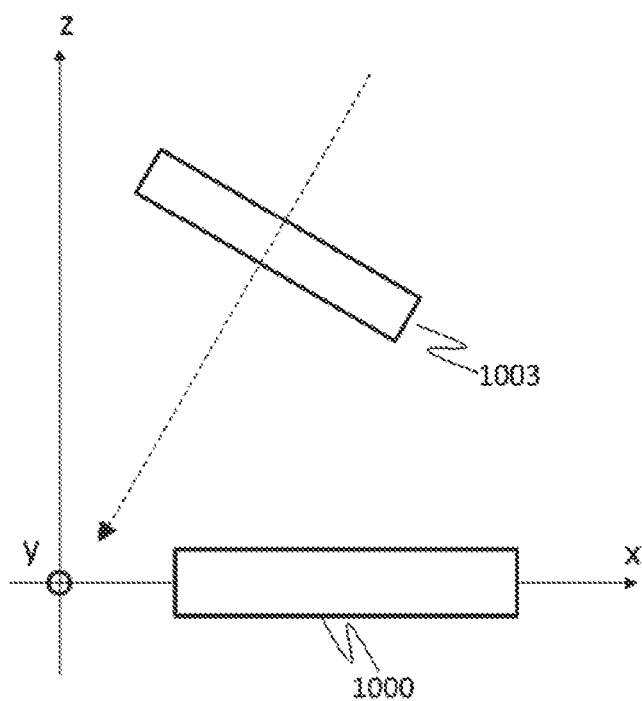
FIG. 11 is a diagram illustrating an example of a positional relation between the object detection apparatus and a target object.

When the target object 1003 faces the object detection apparatus 1000 as illustrated in FIG. 10, intensity of a radio wave being reflected from the target object 1003 and being received by the object detection apparatus is sufficiently high, and therefore the complex permittivity absolute value, the permittivity, or the dielectric loss of the target object 1003 can be measured with high precision. On the other hand, when the target object 1003 is not facing the object detection apparatus 1000 as illustrated in FIG. 11, intensity of the radio wave being reflected from the target object 1003 and being received by the object detection apparatus lowers, and therefore measurement precision of the complex permittivity absolute value, the permittivity, or the dielectric loss of the target object 1003 degrades. Therefore, processing of identifying a constituent substance of the target object 1003 by the substance identification unit 1307 by using at least one of the complex permittivity absolute value, the permittivity, or the dielectric loss when the target object 1003 is determined to face the object detection apparatus 1000 and skipping identification of a constituent substance of the target object 1003 by the substance identification unit 1307 when the target object 1003 is not determined to face the object detection apparatus 1000 may be performed.

Whether the target object 1003 faces the object detection apparatus 1000 can be determined by using the position of the target object 1003 estimated from the reflection amplitude p(x, y, z) of the target object 1003 acquired by the three-dimensional reflection amplitude computation unit 1301 and the value of the angle $\theta_0$ estimated by the two-dimensional reflection amplitude computation unit 1302 and the target object thickness computation unit 1304.

Program

Figure 12:
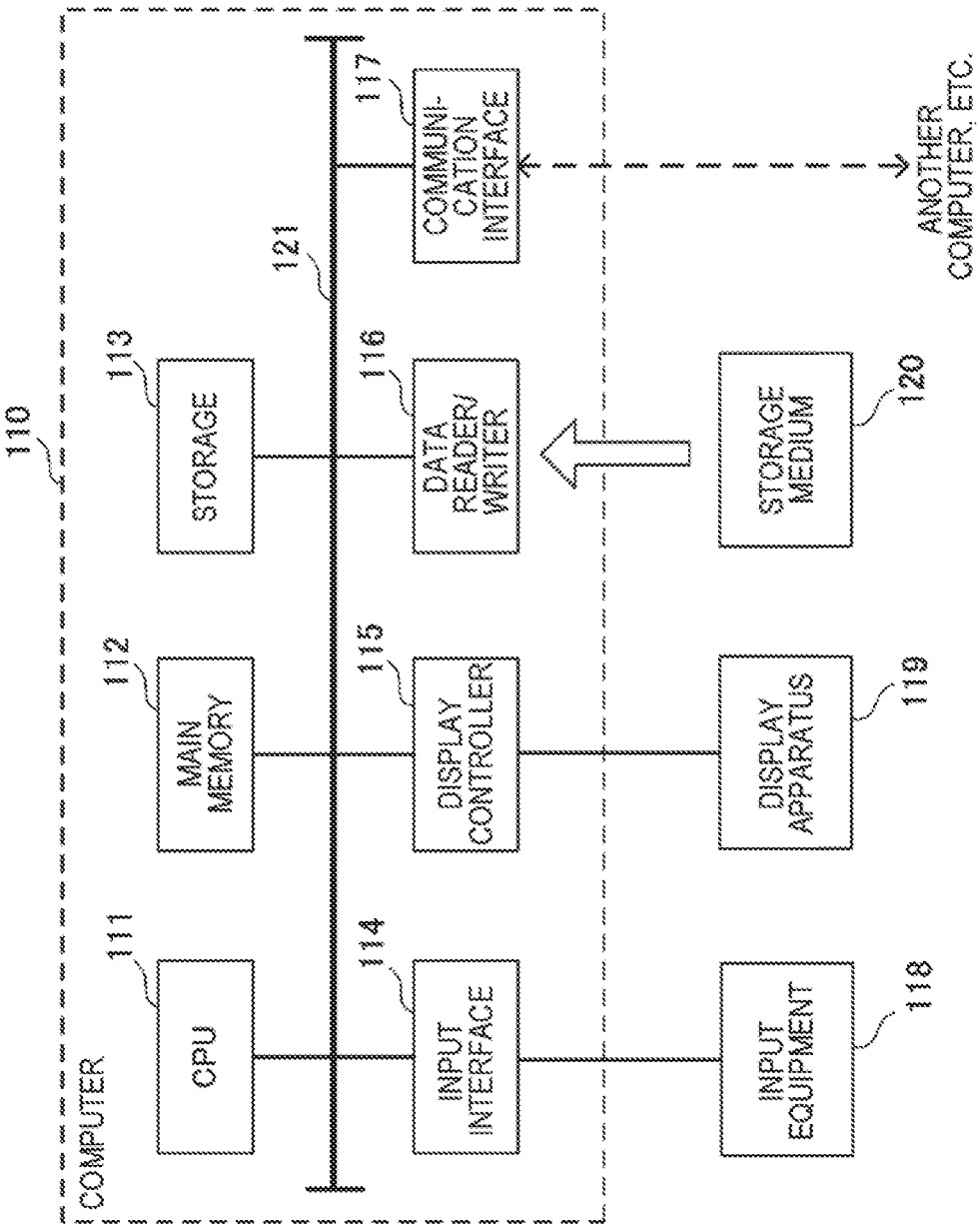
FIG. 12 is a block diagram illustrating an example of a computer providing the object detection apparatus.

A computer (arithmetic apparatus) providing an object detection apparatus by executing a program according to each example embodiment of the present invention is described by using FIG. 12. FIG. 12 is a block diagram illustrating an example of a computer providing the object detection apparatuses according to the example embodiments of the present invention.

As illustrated in FIG. 12, a computer 110 includes a CPU 111, a main memory 112, a storage 113, an input interface 114, a display controller 115, a data reader-writer 116, and a communication interface 117. The components are data communicably connected to each other through a bus 121.

The CPU 111 performs various computations by loading programs (codes) according to each example embodiment stored in the storage 113 into the main memory 112 and executing the programs in a predetermined order. The main memory 112 is typically a volatile storage such as a dynamic random access memory (DRAM). Further, the program according to each example embodiment is provided in a state of being stored in a computer-readable storage medium 120. The program according to each example embodiment may be distributed on the Internet connected through the communication interface 117.

Further, specific examples of the storage 113 include semiconductor storages such as a flash memory in addition to a hard disk drive. The input interface 114 mediates data transmission between the CPU 111 and input equipment 118 such as a keyboard and a mouse. The display controller 115 is connected to a display apparatus 119 and controls display at the display apparatus 119. The computer 110 may include a graphics processing unit (GPU) or a field-programmable gate array (FPGA) in addition to or in place of the CPU 111.

The data reader-writer 116 mediates data transmission between the CPU 111 and the storage medium 120 and executes readout of a program from the storage medium 120 and writing of a processing result in the computer 110 into the storage medium 120. The communication interface 117 mediates data transmission between the CPU 111 and another computer.

Specific examples of the storage medium 120 include general-purpose semiconductor storage devices such as a CompactFlash [(CF) registered trademark] and a secure digital (SD), magnetic storage media such as a flexible disk, and optical storage media such as a compact disk read only memory (CD-ROM).

The object detection apparatus according to each example embodiment may be provided by use of hardware equivalent to the components instead of by a computer installed with a program. Furthermore, part of the object detection apparatus may be provided by a program, and the remaining part may be provided by hardware.

Effect

Effects of the example embodiments of the present invention are summarized below.

The object detection apparatus and object detection method according to the example embodiments of the present invention can measure a complex permittivity absolute value, a permittivity, and a dielectric loss that are substance-specific characteristics of a target object 1003 while reducing an effect of noise of a radar apparatus constituting the object detection apparatus 1000, by using antenna arrays configured with a plurality of transmission antennas 1202 and a plurality of reception antennas 1203, respectively. Furthermore, the object detection apparatus 1000 is configured without using a sensor other than a radar and therefore can measure the complex permittivity absolute value, the permittivity, and the dielectric loss of the target object 1003 without accompanying a cost and an error that result from a sensor other than the radar. Furthermore, the object detection apparatus 1000 can identify a substance constituting the target object 1003 from the value of the complex permittivity absolute value, the permittivity, or the dielectric loss of the target object 1003 acquired by measurement.

Configurations of preferred example embodiments of the present invention have been described above. However, the disclosure of the aforementioned patent literatures and the like may be incorporated herein by reference thereto. The example embodiments may be changed and adjusted within the scope of the entire disclosure of the present invention (including the claims) and on the basis of the basic technological concept thereof Further, various disclosed elements may be combined and selected in a variety of ways within the scope of the claims of the present invention. In other words, it is apparent that the present invention includes various modifications and changes that may be made by a person skilled in the art on the basis of the entire disclosure including the claims, and the technological concept.

It is apparent that the present invention is not limited to the above embodiment, and may be modified and changed without departing from the scope and spirit of the invention.

110: computer
111: CPU
112: main memory
113: storage
114: input interface
115: display controller
116: data reader-writer
117: communication interface
118: input equipment
119: display apparatus
120: storage medium
121: bus 1000: object detection apparatus
1001: transmission-reception apparatus
1002: radio wave(transmission signal)
1003: target object (object as detection target)
1004: radio wave(reception signal)
1005: target object placement plane
1101: transmission unit
1102: reception unit
1201: oscillator
1202: transmission antenna
1203: reception antenna
1204: mixer
1205: interface circuit
1207: variable amplitude phase shifter
1208: terminal
1211: arithmetic apparatus
1301: three-dimensional reflection amplitude computation unit
1302: two-dimensional reflection amplitude computation unit
1303: complex permittivity absolute value computation unit
1304: target object thickness computation unit
1305: permittivity computation unit
1306: dielectric loss computation unit
1307: substance identification unit
1308: target object depth position computation unit
1309: target object orientation computation unit
1400: aperture plane

What is claimed is:

1. An object detection apparatus comprising:
a plurality of transmission antennas projecting a radio wave toward an object;
a plurality of reception antennas receiving the radio wave reflected from the object;
at least one memory storing instructions; and
at least one processor configured to execute the instructions to perform operations comprising:
generating an intermediate frequency signal from a reception signal received by the reception antennas;
computing a distribution of a three-dimensional reflection amplitude of the object in a three-dimensional space from the intermediate frequency signal;
computing a two-dimensional reflection amplitude in a two-dimensional plane from a maximum value of the three-dimensional reflection amplitude in a depth direction perpendicular to the two-dimensional plane;
computing a reflectance of the object by normalizing the two-dimensional reflection amplitude by a maximum value of the two-dimensional reflection amplitude; and
computing a complex permittivity absolute value of the object from the reflectance.

2. The object detection apparatus according to claim 1, wherein the operations further comprise:
computing a depth position where the three-dimensional reflection amplitude has the maximum value in the depth direction perpendicular to the two-dimensional plane;
computing a thickness of the object from the depth position or the two-dimensional reflection amplitude; and
computing a permittivity of the object from the two-dimensional reflection amplitude, the complex permittivity absolute value, and the thickness.

3. The object detection apparatus according to claim 2, wherein the operations further comprise
computing a dielectric loss of the object from the complex permittivity absolute value and the permittivity.

4. The object detection apparatus according to claim 3, wherein the operations further comprise
outputting the complex permittivity absolute value, the permittivity, or the dielectric loss as an image.

5. The object detection apparatus according to claim 3, wherein the operations further comprise
identifying the object by using at least one of the complex permittivity absolute value, the permittivity, and the dielectric loss.

6. The object detection apparatus according to claim 5, wherein the operations further comprise:
computing a position of the object from the reflection amplitude;
computing, for a plurality of depth directions, a distribution representation of the depth position or directional dependency in the depth direction of a sum of the reflection amplitude, and computing an orientation of the object from a depth direction maximizing a peak value of the distribution representation or a sum of the reflection amplitude; and
when the object is determined to face the object detection apparatus from the position of the object and at the orientation of the object, identifying the object by using at least one of the complex permittivity absolute value, the permittivity, and the dielectric loss.

7. The object detection apparatus according to claim 2, wherein
the operations further comprise:
computing distribution representation of the depth position;
computing a reference position of the object from a peak position of the distribution representation of the depth position; and
computing the thickness of the object from a difference between the depth position and the reference position.

8. The object detection apparatus according to claim 2, wherein
the operation further comprise:
computing a sum of a reflection amplitude in a plane perpendicular to the depth direction;
computing a reference position of the object based on a depth position where a peak of directional dependency in the depth direction of the sum of the reflection amplitude appears; and
computing the thickness of the object from a difference between the depth position and the reference position.

9. The object detection apparatus according to claim 7, wherein the operations further comprise:
computing, for a plurality of depth directions, the distribution representation of the depth position or directional dependency in the depth directions of a sum of the reflection amplitude;
computing an orientation of the object from the depth direction maximizing a peak value of the distribution representation or a sum of the reflection amplitude; and
computing the thickness of the object along the orientation of the object.

10. An object detection method for detecting an object by a radio wave, the object detection method performed by a computer and comprising:

projecting a radio wave toward the object from a plurality of transmission antennas;

receiving the radio wave reflected from the object by a plurality of reception antennas;

generating an intermediate frequency signal from a reception signal received by the reception antennas;

computing a three-dimensional reflection amplitude of the object in a three-dimensional space from the intermediate frequency signal;

computing a two-dimensional reflection amplitude in a two-dimensional plane from a maximum value of the three-dimensional reflection amplitude in a depth direction perpendicular to the two-dimensional plane;

computing a reflectance of the object by normalizing the two-dimensional reflection amplitude by a maximum value of the two-dimensional reflection amplitude; and computing a complex permittivity absolute value of the object from the reflectance.

11. The object detection method according to claim 10, further comprising:

computing a depth position where the three-dimensional reflection amplitude has the maximum value in the depth direction perpendicular to the two-dimensional plane;

computing a thickness of the object from the depth position or the two-dimensional reflection amplitude; and computing a permittivity of the object from the two-dimensional reflection amplitude, the complex permittivity absolute value, and the thickness.

12. The object detection method according to claim 11, further comprising computing a dielectric loss of the object from the complex permittivity absolute value and the permittivity.

13. The object detection method according to claim 12, further comprising identifying the object by using at least one of the complex permittivity absolute value, the permittivity, or the dielectric loss.

14. A non-transitory computer readable medium storing a program for an object detection apparatus comprising:

a plurality of transmission antennas projecting a radio wave toward an object;

a plurality of reception antennas receiving the radio wave reflected from the object; and a processor, wherein the program is executable by the processor to perform operations comprising:

generating an intermediate frequency signal from a reception signal received by the reception antennas;

computing a three-dimensional reflection amplitude of the object in a three-dimensional space from the intermediate frequency signal;

computing a two-dimensional reflection amplitude in a two-dimensional plane from a maximum value of the three-dimensional reflection amplitude in a depth direction perpendicular to the two-dimensional plane;

computing a reflectance of the object by normalizing the two-dimensional reflection amplitude by a maximum value of the two-dimensional reflection amplitude; and computing a complex permittivity absolute value of the object from the reflectance.

15. The non-transitory computer readable medium according to claim 14, wherein the operations further comprise:

computing a depth position where the three-dimensional reflection amplitude has the maximum value in the depth direction perpendicular to the two-dimensional plane;

computing a thickness of the object from the depth position or the two-dimensional reflection amplitude; and computing a permittivity of the object from the two-dimensional reflection amplitude, the complex permittivity absolute value, and the thickness.

16. The non-transitory computer readable medium according to claim 15, wherein the operations further comprise computing a dielectric loss of the object from the complex permittivity absolute value and the permittivity.

17. The non-transitory computer readable medium according to claim 16, wherein the operations further comprise identifying the object by using at least one of the complex permittivity absolute value, the permittivity, or the dielectric loss.

* * * * *